United States Patent Office 3,547,695
Patented Dec. 15, 1970

3,547,695
PROCESS FOR TREATING GUM ARABIC
Levon B. Agazarian, 50 St. James St.,
London, SW. 1, England
No Drawing. Filed Dec. 19, 1968, Ser. No. 785,383
Int. Cl. C08b 29/00
U.S. Cl. 134—34                             8 Claims

ABSTRACT OF THE DISCLOSURE

Processing crude, partially hardened gum arabic tears by mechanically removing the oxidized outer layer containing foreign substances, as by dry scrubbing the gum tears. The gum tear, once free of surface impurities, may be solubilized and spray-dried to form a sterilized, highly purified, gum arabic.

BACKGROUND OF THE INVENTION

This invention relates to a process for treating partially hardened gum arabic. In particular, it relates to a process for removing the oxidized outer layer containing foreign substances from partially hardened gum arabic.

Gum arabic is exuded as a liquid from the Acacia tree, which is found in Africa, principally in the Sudan. The gum collects as a spherical tear, which expands as more gum is exuded into the inner core of the tear. The gum is soft and tacky as it exudes from the tree, but within a short time, the outer layer of the gum tear becomes contaminated with foreign substances, such as fine sand, dirt, insects, pieces of bark and leaves, bacteria and the like. The contaminated outer layer of the gum tear hardens as a result of air oxidation. Therefore, much of the gum arabic which has been available for transshipment to world markets has been discolored, coated with undesirable surface impurities and otherwise unfit for immediate use.

Since gum arabic is extensively employed in the food and pharmaceutical industry, for example, to produce the froth in beer, as a binder for drugs and medicines, as an inert base material in the candy industry and the like, it has been necessary to process the contaminated gum to render it acceptable for human use. Gum also has extensive industrial applications, particularly in the adhesive and paint industry, where it is primarily employed as a binder or stabilizer. However, even here the demand has been for a colorless or white, granulated or powdered form of gum.

Almost all the gum received at world markets has completely hardened by such processes as air oxidation and the like, during transshipment. Attempts to remove the undesirable oxidized outer layer from the inner core of substantially pure gum have failed, for the most part, since the gum tends to shatter during conventional processing designed to abrade or scalp the outer layer from the inner core. It has proven necessary to employ a combination of difficult, expensive, and time-consuming steps to purify the contaminated gum. Typical purification processes comprise dissolving the gum in a solvent, screening and filtering the gum to remove foreign substances, separating such foreign substances from the gum solution; recovering gum from the solution, and then destroying bacteria which may be present in the gum.

Accordingly, there exists an urgent need for a simple and direct method of producing a gum arabic suitable for immediate industrial, food and pharmaceutical use, free of side effects and deficiencies of the prior art.

SUMMARY OF THE INVENTION

It is the primary object of this invention to provide a process for removing impurities in the nature of foreign substances from gum arabic. It is another object of this invention to provide a process for producing an aseptic, highly purified gum arabic suitable for use in the pharmaceutical and food industries. In addition, it is an object of this invention to provide a process for producing a purified, granular or powdered gum arabic suitable for industrial uses, for example, as a suspending agent, an emulsifier, stabilizer, and pigment binder. It is a further object to accurately remove foreign substances from the hardened outer layer of gum arabic tears, prior to transshipment, so that a purified, aseptic product, available for immediate use can be transshipped.

Accordingly, the above and other objects of this invention are achieved by removing the oxidized outer layer from partially hardened gum arabic, thereby removing foreign substances. The gum may be immediately packaged employing aseptic conditions after removal of the oxidized outer layer. Partially hardened gum is that form of gum arabic having a hardened outer shell and a tacky or plastic center core. Gum arabic harvested from the Acacia tree is sufficiently partially hardened for the purposes of this invention within from about one to three months subsequent to its removal from the tree. It is within the scope of this invention to plasticize the inner core of a substantially completely hardened gum arabic and then remove the hardened outer layer according to the invention.

Generally the outer layer of the partially hardened gum may be accurately removed by scalping, abrading or scrubbing away the outer surface. This hardened oxidized outer surface is readily removed without fracturing the remaining core, since the tacky, plastic interior of the gum tends to remain intact and resists fracture during processing. It is to be understood that the process is not limited to treating spherical gum tears harvested from the Acacia tree, but is applicable to any gum arabic having a hardened outer layer and a plastic inner core.

Generally it is sufficient to remove from about $1/32$ to about $1/8$ of an inch from the outer surface of the gum. These values may be varied, depending in part, on the degree to which the gum is oxidized, depth of penetration of foreign substances into the core, and the accuracy of the equipment employed to remove the outer crust. A small portion of the inner core may also be removed with the outer crust if need be, to insure substantial removal of foreign substances.

This outer surface can be conveniently removed by conveying the gum through a nip formed between a pair of rollers. The gum is flattened by this process and, thereafter, it is passed between a pair of rotating knife blades. The blades may be adjusted to selectively remove the outer layer containing surface impurities.

Similarly, the gum may be compressed and then passed between a pair of heated wires spaced below the outer shell of the flattened gum. The heated wires selectively remove the outer surface of the gum. The inner core of the gum can be packaged under aseptic conditions for transshipment. If desired, the gum core may be subjected to irradiation or other means for destroying bacteria, before packaging.

Though most foreign substances are present in the hardened outer shell, some impurities may have penetrated the inner core. To remove such impurities from the inner core and, in addition, to destroy bacteria therein, the inner core is solubilized in a fluid to form a solution and, thereafter, the solution is sprayed dried, whereby a highly purified, aseptic gum arabic is formed. The spray dried gum can be packaged immediately to protect the gum from contamination during transshipment. It has been found that the elevated temperatures employed during spray drying kill many strains of bacteria, such as Salmonella and Shigella.

The foreign substances freed for the gum core upon solubilization are separated from the gum solution by conventional techniques such as decantation, filtration, skimming, or centrifugation. Normally, the insoluble foreign substances are sand, dirt, bark and leaf particles and the like, which may have penetrated and become occluded in the gum core.

In order to recover an aseptic gum arabic powder from the purified solution, suitable for immediate packaging and transshipment, the gum solution is spray dried, that is; the gum solution is atomized using a high pressure nozzle, a pneumatic nozzle, rapidly rotating discs or the like, and then the gum is immediately dried. In spray drying the atomized particles are introduced into a chamber. As the atomized particles enter the chamber, a stream of heated gas is contacted with the particles and fluid is vaporized. Typical gases employed for this purpose include non-combustible gases such as inert gases, carbon dioxide, flue gases and the like. Other means may be employed to vaporize the fluid carrier, for example, the atomized particles can be passed through a flame to flash dry the gum arabic.

Generally the resulting dried gum arabic particles formed settle to the bottom of the dryer and are collected. The particles are usually then packaged by conventional means in order to maintain their aseptic state.

Gum arabic is reclaimed from the oxidized impure outer layer, which is separated from the substantially pure inner core of gum, by various techniques. For example, the outer layer is solubilized in a fluid, fluid insoluble impurities are allowed to settle, the solution is filtered and thereafter spray dried. The gum arabic produced in the spray dryer is thereafter packaged for immediate shipment.

In order to enhance the fluid-solubility of the removed outer layer, it may be necessary to pulverize the layer. Generally once the removed outer layer, containing gum arabic and foreign substances, is solubilized, heavy impurities settle out of the solution readily and lighter impurities float to the surface of the solution where they may be skimmed off. If desired, the solution may be filtered through a series of pressed paper filters or the like to remove fine impurities.

It is an advantage of this process that the inner core gum arabic product is of unusual purity and free from undesirable colored foreign substances. The major colored contaminant in gum, tannin, is separated from the inner shell of the gum tear when the outer layer is removed. The removal of such colored contaminates is essential for many industrial and almost all pharmaceutical and food uses.

DESCRIPTION OF PREFERRED EMBODIMENTS

It is preferred to employ dry scrubbers to accurately remove the oxidized outer layer from partially hardened gum arabic. Generally, it is more preferable to employ those dry scrubbers having a revolving drum, which is swept by a stream of air that carries away fines and other lighter surface impurities. Those dry scrubbers having perforations in the revolving drum are particularly suitable, since heavy impurities, such as sand, bark, leaves, dirt and the like, which are abraded from the surface of the gum, can pass through the perforations readily. Best results are obtained when a dry scrubber is employed which imparts a maximum of rolling action to the gum rather than a tumbling action. Maximum abrasion is obtained by the constant rolling action between lumps of gum. When tumbling occurs, there is a greater tendency for the lumps to fracture owing to the sudden impacts received by the individual gum cores.

If desired, a wet scrubber may be employed. In such a scrubber, a fluid sweep, rather than an air sweep, is employed to carry away foreign substances, which are abraded from the oxidized outer layer. The inner core of the gum should not be soluble in this fluid sweep, otherwise the inner cores will tend to coalesce into a tacky mass, which will contain occluded impurities formerly located on the surface of the gum.

In this step it is important to employ a procedure which will substantially remove the outer surface of the gum. If the oxidized layer is only partially removed, it will be necessary to remove surface impurities in later steps. Further, the inner core of gum will not be of suitable purity to warrant packaging and transshipment. If a relatively large portion of the plastic inner core is also removed with the outer layer, a tacky mass of gum arabic and foreign substances may be formed. This mass will be difficult to separate from the purified inner cores. The procedures described heretofore for removing the oxidized outer layer, can accurately scalp the outer layer from the inner core.

After the oxidized outer layer has been removed from the inner core, it is preferable to employ water to solubilize the gum prior to spray drying, owing in part to the high water solubility of gum. It may be necessary to heat the mixture of water and gum or to preheat the water in order to enhance the solubility of gum therein. In this event, however, it is not desirable to heat the water much above room temperature, preferably below about 150° F. in order to avoid hydrolyzing the gum arabic. If need be, water insoluble impurities may be removed from this solution by a combination of settling, skimming, filtering and the like.

In spray drying, it is preferable to employ heated air, which is passed co-current with the atomized particles, or preferably, counter-current to the particles to vaporize the water carrier. It is preferred that the temperature of the heated air be substantially above the boiling point of water to expedite evaporation, preferably above about 500° F. For best results, the gum arabic is collected at the bottom of the spray dryer and immediately packaged in sealed bags by mechanical means. These bags may be cloth bags, or, preferably, polyethylene bags, which can be immediately heat sealed to insure continuous freedom from contamination.

The process is advantageously conducted on a continuous basis. If desired, the process may be conducted on a semi-continuous basis.

It is to be understood that certain modifications can be made. For example, after the oxidized outer layer has been removed from the partially hardened gum arabic, the inner core is hardened and thereafter the gum is pulverized and packaged. Generally the gum is sufficiently hardened to allow pulverizing after from three to four months subsequent to removal from the Acacia tree. Alternatively, the gum may be hardened by conventional dehydration techniques, keeping in mind, however, that excessive prolonged heat may cause deterioration of the gum product.

After hardening, the gum is readily pulverized to a selected size by conventional puverizers such as the hammer-mill, three-stage grinding mill, or an aspirated, rotary beater-type, micro-pulverizer. Generally the pulverizer is employed in conjunction with a cyclone or other filtering device. The gum arabic powder produced can be pasturized or sterilized by conventional techniques and then immediately packaged for shipment.

In order to obtain maximum benefit from the process, it is generally advisable to process the raw gum, as harvested, into a variety of products. For instance, the oxidized outer layer of the partially hardened gum is removed. This oxidized outer layer is reclaimed by solubilizing the outer layer, filtering it and then spray drying the filtered gum. Generally, it is most desirable to sterilize the reclaimed gum because of the high initial concentration of foreign substances therein.

The inner cores comprising substantially pure gum arabic are then divided into three portions. A first portion is immediately packaged or first subjected to irradiation and then packaged. This gum is useful in many industrial applications, wherein a lesser degree of impurity is permitted. A second portion of the gum may be hardened and then pulverized to an appropriate powder size. This powder is then classified and immediately packaged. The final portion of the purified gum cores are solubilized and then spray dried. Thereafter, the gum is packaged for transshipment.

If desired, to expedite solubilization of scalped inner cores, said cores may be reduced in size by conventional pulverizing techniques, as grinding, hammer milling, micro-pulverizing or the like. Usually it is sufficient to pulverize the cores to a size of less than about 10 Tyler Mesh prior to solubilization.

It is important to note that if the gum is not sterilized either through spray drying or by other means, it has been found that during transshipment the gum may undergo severe deterioration owing to bacterial attack. Recently, world health services have been very much concerned with the condition of imported gum, so that it is important that the gum is handled under aseptic conditions and immediately packaged.

I claim:

1. Method for processing gum arabic comprising mechanically removing the impurity-containing outer layer from partially hardened gum arabic.

2. The method of claim 1 in which the removed impure outer layer is processed to reclaim gum arabic comprising solubilizing the removed impure outer layer in a fluid, allowing fluid insoluble impurities to settle, filtering the solution, thereafter spray-drying the filtered solution, collecting dried gum arabic and packaging said gum under aseptic conditions.

3. The method of claim 1 in which the outer layer is removed by dry scrubbing.

4. The method of claim 3 in which the gum arabic is dry-scrubbed in a revolving drum, having a plurality of perforations, said drum being swept by a stream of air which carries away fines and lighter than air surface impurities, heavier than air surface impurities being exhausted from the drum through said perforations.

5. The method of claim 4 in which the scrubbed gum tears are thereafter sterilized and then packaged under aseptic conditions.

6. Method for processing gum arabic comprising:
 (a) Mechanically removing the impurity-containing outer layer from partially hardened gum arabic;
 (b) Solubilizing the purified gum in a fluid to form a solution free of fluid-insoluble impurities; and then
 (c) Spray-drying the solubilized gum arabic, whereby a sterilized, highly purified gum arabic is formed.

7. The method of claim 6 in which the gum is dissolved in water to allow water insoluble impurities to separate out, and then the solution of gum arabic is sprayed into a chamber in which a stream of heated gas is passed counter-current to said spray, the gas being at a temperature sufficient to evaporate the water.

8. The method of claim 7 in which the gas is air and after spray-drying, the dried gum is collected and packaged under aseptic conditions.

References Cited

UNITED STATES PATENTS

| | | | |
|---|---|---|---|
| 543,636 | 7/1895 | Walters | 106—205X |
| 976,116 | 11/1910 | Beckmann | 106—205 |
| 1,263,635 | 4/1918 | Alexander | 106—205 |
| 1,983,650 | 12/1934 | Wolfe | 106—205X |
| 1,986,360 | 1/1935 | Rewald | 106—205 |

FOREIGN PATENTS 17,558  5/1900  Great Britain.

JOSEPH SCOVRONEK, Primary Examiner

S. MARANTZ, Assistant Examiner

U.S. Cl. X.R.

106—205